(12) United States Patent
Chen et al.

(10) Patent No.: US 8,085,021 B2
(45) Date of Patent: Dec. 27, 2011

(54) PFC CONVERTER HAVING TWO-LEVEL OUTPUT VOLTAGE WITHOUT VOLTAGE UNDERSHOOTING

(75) Inventors: Cheng-Sung Chen, Taichung County (TW); Chien-Tsun Hsu, Taipei (TW); Ting-Ta Chiang, Chiayi County (TW); Shao-Chun Huang, New Taipei (TW)

(73) Assignee: System General Corp., Taipei Hsien (TW)

( * ) Notice: Subject to any disclaimer, the term of this patent is extended or adjusted under 35 U.S.C. 154(b) by 328 days.

(21) Appl. No.: 12/419,302

(22) Filed: Apr. 7, 2009

(65) Prior Publication Data

US 2010/0253307 A1 Oct. 7, 2010

(51) Int. Cl.
*G05F 1/56* (2006.01)
*G05F 1/44* (2006.01)
*G05F 1/40* (2006.01)

(52) U.S. Cl. ......... 323/282; 323/283; 323/284; 323/285
(58) Field of Classification Search .................. 323/282, 323/283, 284, 285
See application file for complete search history.

(56) References Cited

U.S. PATENT DOCUMENTS

| | | | | |
|---|---|---|---|---|
| 5,943,227 A | * | 8/1999 | Bryson et al. | 363/95 |
| 7,030,596 B1 | * | 4/2006 | Salerno et al. | 323/282 |
| 7,800,351 B2 | * | 9/2010 | Gan | 323/283 |
| 2008/0129265 A1 | * | 6/2008 | Rosenthal | 323/283 |
| 2009/0200997 A1 | * | 8/2009 | Yang et al. | 323/234 |
| 2009/0237053 A1 | * | 9/2009 | Gan | 323/283 |

* cited by examiner

*Primary Examiner* — Bao Q Vu
(74) *Attorney, Agent, or Firm* — Jianq Chyun IP Office

(57) ABSTRACT

A switching controller for a PFC converter is provided. The switching controller comprises a switching-control circuit, a current-command circuit, a programmable feedback circuit, a modulator, an over-voltage detection circuit, and a light-load detection circuit. The switching controller is capable of regulating a bulk voltage of the PFC converter at different levels in response to load conditions of the PFC converter. A turbo current eliminates a first voltage undershooting of the bulk voltage at the transient that the bulk voltage decreases to arrive at a second level from a first level. A voltage-loop error signal is maximized to eliminate a second voltage undershooting of the bulk voltage at the transient that the bulk voltage starts to increase toward the first level from the second level.

14 Claims, 6 Drawing Sheets

PFC CONVERTER HAVING TWO-LEVEL OUTPUT VOLTAGE WITHOUT VOLTAGE UNDERSHOOTING

BACKGROUND OF THE INVENTION

1. Field of the Invention

The present invention relates to power factor correction (PFC) converters, and more particularly, relates to a switching controller of PFC converters.

2. Description of Related Art

Figure 1:
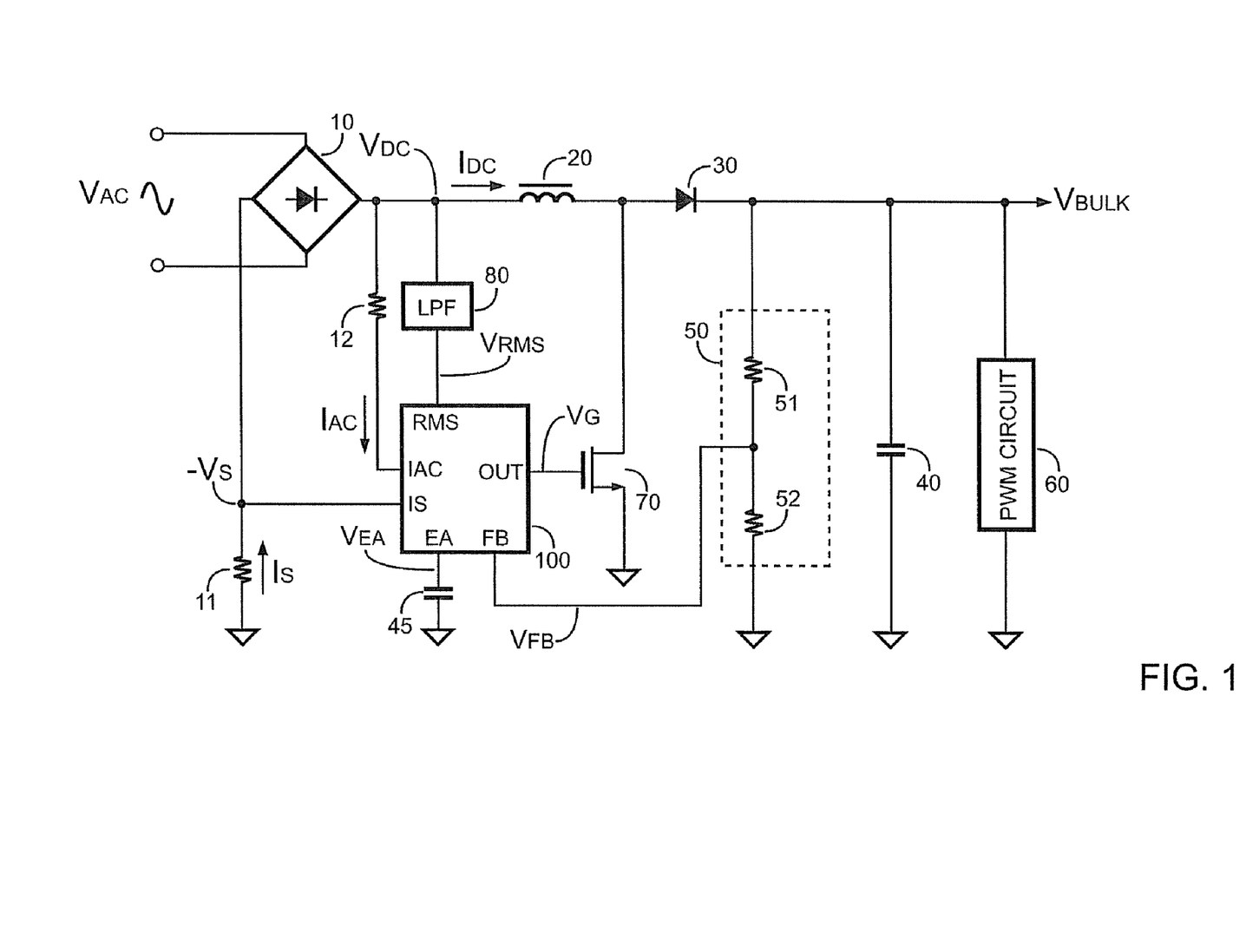
FIG. 1 schematically shows a circuit of a PFC converter.

FIG. 1 schematically shows a circuit of a PFC converter. A bridge rectifier 10 rectifies a line voltage $V_{AC}$ into an input voltage $V_{DC}$. The input voltage $V_{DC}$ is supplied to an inductor 20. A low-pass filter 80 receives the input voltage $V_{DC}$ to generate a line-effective voltage $V_{RMS}$. A rectifier 30 is connected between the inductor 20 and an output of the PFC converter. A bulk capacitor 40 is coupled between the output of the PFC converter and a ground reference to provide a bulk voltage $V_{BULK}$. The bulk voltage $V_{BULK}$ is a boosted voltage which is higher than the input voltage $V_{DC}$. The bulk voltage $V_{BULK}$ is used to provide power to a load of the PFC converter, for example, a PWM circuit 60. A power switch 70 coupled to a joint of the inductor 20 and the rectifier 30 performs energy switching to correct the line current of the PFC converter and regulate the bulk voltage $V_{BULK}$. A voltage divider 50 including resistors 51 and 52 connected in series is connected between the output of the PFC converter and the ground reference.

A switching controller 100 has a line-voltage terminal RMS, a line-current terminal IAC, a current-sense terminal IS, a compensation terminal EA, a feedback terminal FB, and an output terminal OUT. The low-pass filter 80 receives the input voltage $V_{DC}$ and provides the line-effective voltage $V_{RMS}$ to the line-voltage terminal RMS. The line-current terminal IAC is coupled to the bridge rectifier 10 via a line resistor 12 for receiving a line-reference current $I_{AC}$. A sense resistor 11 is coupled to the bridge rectifier 10. The current-sense terminal IS is connected to a joint of the sense resistor 11 and the bridge rectifier 10 to obtain a sense voltage $-V_S$. The sense voltage $-V_S$ represents an overall system current $I_S$ of the PFC converter. A compensation capacitor 45 is connected to the compensation terminal EA for frequency compensation. A voltage-loop error signal $V_{EA}$ is obtained across the compensation capacitor 45. The feedback terminal FB receives a feedback voltage $V_{FB}$ from a joint of the resistor 51 and the resistor 52. The switching controller 100 generates a switching signal $V_G$ at the output terminal OUT in response to the feedback voltage $V_{FB}$, the line-effective voltage $V_{RMS}$, the line-reference current $I_{AC}$, and the sense voltage $-V_S$.

Figure 2:
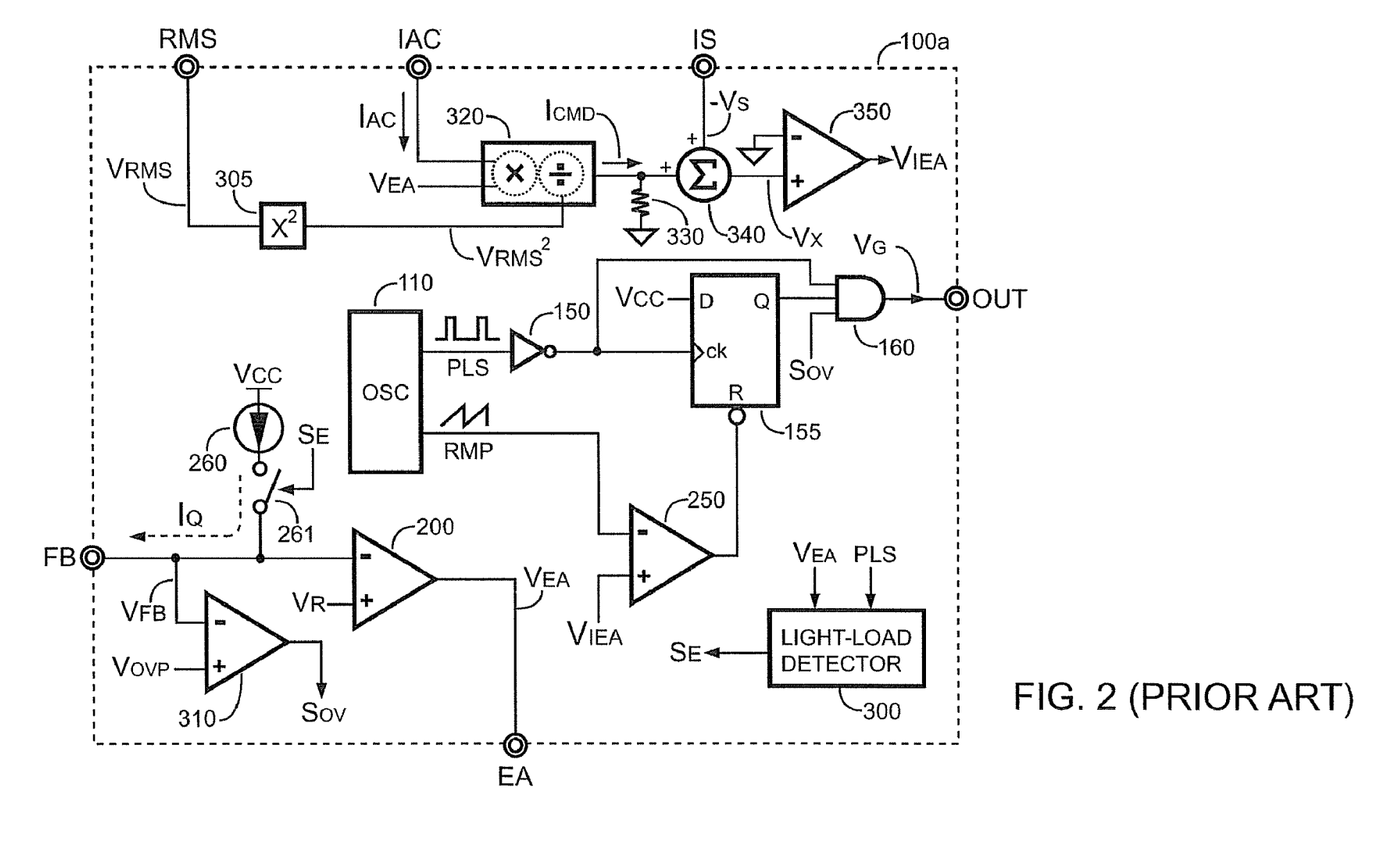
FIG. 2 schematically shows a circuit of a conventional switching controller of the PFC power converter.

FIG. 2 schematically shows a circuit of a conventional switching controller 100a. The switching controller 100a comprises a current-command circuit, a switching-control circuit, a programmable feedback circuit, a light-load detector 300, and an over-voltage comparator 310. The current-command circuit comprises a square circuit 305, a multiplier-divider 320, a resistor 330, an adder 340, and a current-loop error amplifier 350. An input of the square circuit 305 is connected to the line-voltage terminal RMS for receiving the line-effective voltage $V_{RMS}$. The multiplier-divider 320 comprises a first multiplier input terminal connected to the line-current terminal IAC for receiving the line-reference current $I_{AC}$, a second multiplier input terminal for receiving the voltage-loop error signal $V_{EA}$, and a divider input terminal connected to an output terminal of the square circuit 305 for receiving a squared line-effective voltage $V_{RMS}^2$.

The multiplier-divider 320 generates a current command signal $I_{CMD}$, which is expressed by following equation (1):

$$I_{CMD} \propto k \times \left( \frac{I_{AC} \times V_{EA}}{V_{RMS}^2} \right), \quad (1)$$

where k is a constant, $I_{AC}$ is the line-reference current, $V_{EA}$ is the voltage-loop error signal, and $V_{RMS}$ is the line-effective voltage.

The adder 340 generates a command signal $V_X$, which is expressed by following equation (2):

$$V_X = I_{CMD} \times R_{330} + (-V_S) \quad (2)$$

where $I_{CMD}$ is the current command signal, $R_{330}$ is the resistance of the resistor 330, and $-V_S$ is the sense voltage to present the overall system current $I_S$ of the PFC converter. The current-loop error amplifier 350 amplifies the command signal $V_X$ to generate a current-loop error signal $V_{IEA}$.

The switching-control circuit of the conventional switching controller 100a comprises an oscillator 110, an inverter 150, a flip-flop 155, an AND gate 160, and a comparator 250. The oscillator 110 generates a pulse signal PLS and a ramp signal RMP. The pulse signal PLS clocks the flip-flop 155 via the inverter 150 to enable the switching signal $V_G$. The comparator 250 compares the current-loop error signal $V_{IEA}$ and the ramp signal RMP. Once the ramp signal RMP is higher than the current-loop error signal $V_{IEA}$, the switching signal $V_G$ is disabled via the flip-flop 155 and the AND gate 160.

In conventional PFC converter, when the input voltage $V_{DC}$ is 90 VDC, for example, the bulk voltage $V_{BULK}$ is boosted up to around 380 VDC irrespective of load conditions of the PFC converter. As the load decreases to a light-load condition, the bulk voltage $V_{BULK}$ of the PFC converter in the related arts remains at 380 VDC, for example, in a first level. This lowers the conversion efficiency because a level of the bulk voltage $V_{BULK}$ to sufficiently supply the load is only 300 VDC, for example, a second level. Redundant power consumption is therefore wasted on the switching loss of the power switch 70 and the power loss of the rectifier 30.

To avoid redundant power consumption and achieve higher efficiency of the PFC converter, the programmable feedback circuit of the conventional switching controller 100a is utilized to regulate the bulk voltage $V_{BULK}$ between the first level and the second level in response to the load conditions of the PFC converter. The programmable feedback circuit comprises a current source 260, a switch 261, and a voltage-loop error amplifier 200. The current source 260 is supplied with a supply voltage $V_{CC}$. The switch 261 is connected between the current source 260 and a negative input terminal of the voltage-loop error amplifier 200. The negative input terminal of the voltage-loop error amplifier 200 is connected to the feedback terminal FB of the conventional switching controller 100a and the voltage divider 50. A positive input terminal of the voltage-loop error amplifier 200 is supplied with a feedback threshold $V_R$. An output terminal of the voltage-loop error amplifier 200 is connected to the compensation terminal EA.

Figure 3:
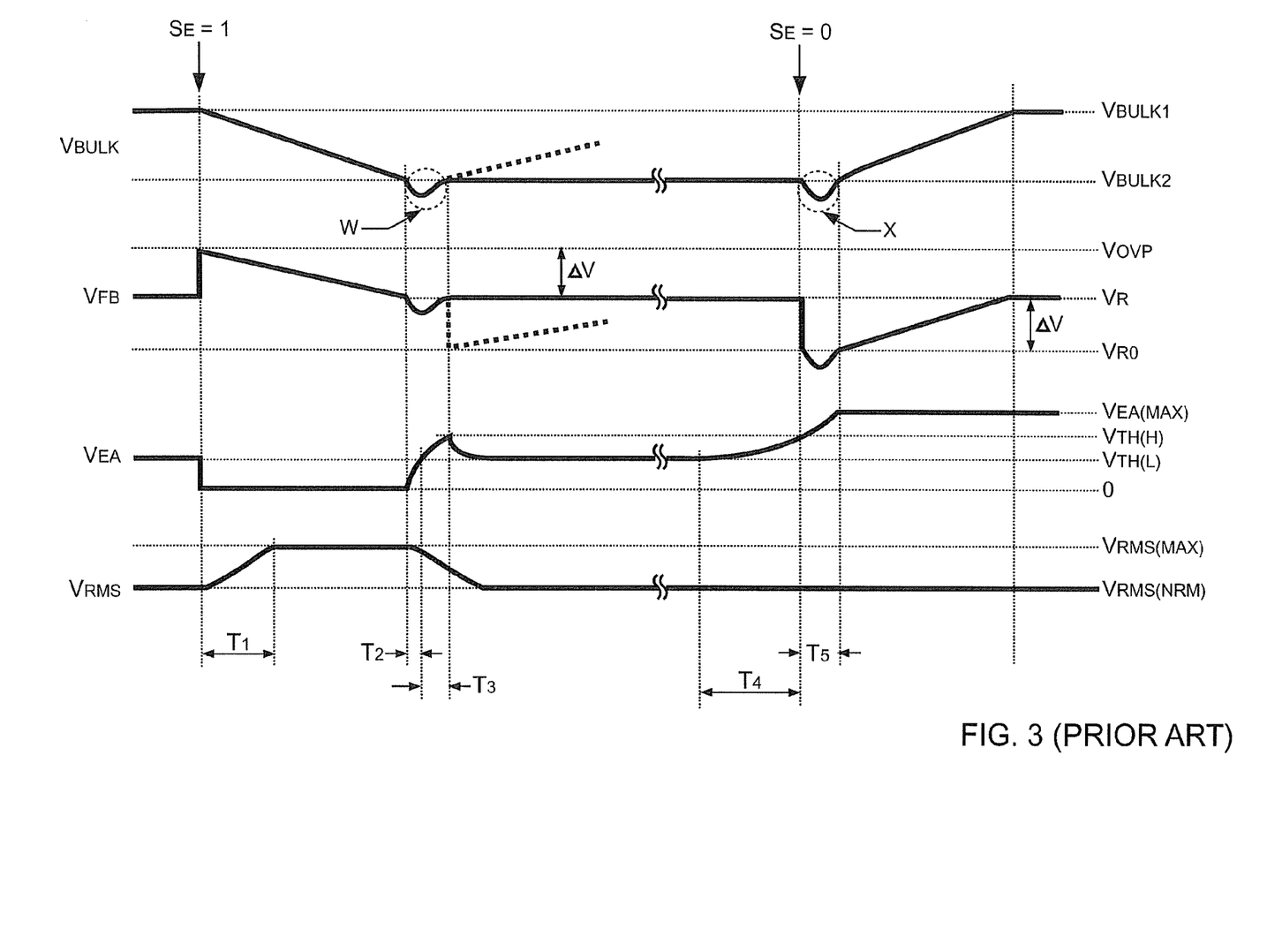
FIG. 3 shows key waveforms of the conventional switching controller of the PFC power converter.

The conventional switching controller 100a further comprises a light-load detector 300 to receive the voltage-loop error signal $V_{EA}$ and the pulse signal PLS to generate a power-saving signal $S_E$. The light-load detector 300 has a hysteresis characteristic with an upper threshold $V_{TH(H)}$ and a lower threshold $V_{TH(L)}$. Once the voltage-loop error signal $V_{EA}$ is lower than the lower threshold $V_{TH(L)}$, a light-load condition of the load will be detected. The power-saving signal $S_E$ is enabled when the light-load detector 300 detects the light-load condition. The switch 261 is controlled by the power-saving signal $S_E$. Under normal/heavy load conditions, the power-saving signal $S_E$ is disabled, and the bulk voltage $V_{BULK}$ is regulated at a first level $V_{BULK1}$ (as shown in FIG. 3) in response to the voltage-loop error signal $V_{EA}$. As the light-load condition is detected by the light-load detector 300, the power-saving signal $S_E$ is enabled to turn on the switch 261. The current source 260 provides a programming current $I_Q$ toward the voltage divider 50. The increased feedback voltage $V_{FB}$ at the negative input terminal of the voltage-loop error amplifier 200 regulates the bulk voltage $V_{BULK}$ from the first level $V_{BULK1}$ toward a second level $V_{BULK2}$ (as shown in FIG. 3). As the load increases to the normal/heavy load condition, the power-saving signal $S_E$ is disabled to turn off the switch 261, and the programming current $I_Q$ is terminated in response thereto. The feedback voltage $V_{FB}$ at the negative input terminal of the voltage-loop error amplifier 200 is therefore decreased to regulate the bulk voltage $V_{BULK}$ from the second level $V_{BULK2}$ toward the first level $V_{BULK1}$ again (as shown in FIG. 3).

However, voltage undershooting occurs as shown in dotted circles W and X of FIG. 3. A first voltage undershooting (in the dotted circle W) occurs at the transient that the bulk voltage $V_{BULK}$ decreases to arrive at the second level $V_{BULK2}$ from the first level $V_{BULK1}$. A second voltage undershooting (in the dotted circle X) occurs at the transient that the bulk voltage $V_{BULK}$ starts to increase toward the first level $V_{BULK1}$ from the second level $V_{BULK2}$.

Referring to both FIG. 2 and FIG. 3, the first voltage undershooting (in the dotted circle W) is explained as follows. As the load at the output of the PFC converter decreases, the feedback voltage $V_{FB}$ at the feedback terminal FB of the switching controller 100a increases in response to the increment of the bulk voltage $V_{BULK}$. Since the feedback voltage $V_{FB}$ is supplied to the negative input terminal of the voltage-loop error amplifier 200, the voltage-loop error signal $V_{EA}$ generated by the voltage-loop error amplifier 200 is inversely proportional to the feedback voltage $V_{FB}$. When the voltage-loop error signal $V_{EA}$ is lower than the lower threshold $V_{TH(L)}$, the power-saving signal $S_E$ is enabled to turn on the switch 261. The programming current $I_Q$ flows toward the voltage divider 50 as shown in FIG. 1. This further increases the feedback voltage $V_{FB}$. The voltage-loop error signal $V_{EA}$ drops to zero from the lower threshold $V_{TH(L)}$ as the feedback voltage $V_{FB}$ exceeds the feedback threshold $V_R$. When the feedback voltage $V_{FB}$ exceeds an over-voltage threshold $V_{OVP}$, the over-voltage comparator 310 generates an over-voltage signal $S_{OV}$ to disable the switching signal $V_G$ via the AND gate 160. The waveform of the input voltage $V_{DC}$ will become direct-current waveform from full-wave rectified waveform. As period $T_1$ illustrates, the line-effective voltage $V_{RMS}$ is charged to reach its maximum level $V_{RMS(MAX)}$ via an RC network of the low-pass filter 80 in FIG. 1 by the input voltage $V_{DC}$.

The bulk voltage $V_{BULK}$ starts to linearly decrease from the first level $V_{BULK1}$ because the switching signal $V_G$ is disabled. The feedback voltage $V_{FB}$ then linearly decreases in response to the decrement of the bulk voltage $V_{BULK}$. Once the feedback voltage $V_{FB}$ drops to around the feedback threshold $V_R$, an output current of the voltage-loop error amplifier 200 begins to charge up the compensation capacitor 45 via the compensation terminal EA. As period $T_2$ illustrates, the voltage-loop error signal $V_{EA}$ is charged up with a slope determined by the output current of the voltage-loop error amplifier 200 and the capacitance of the compensation capacitor 45. Referring to equation (1) described above, the magnitude of the current-command signal $I_{CMD}$ is relatively small due to the excessive line-effective voltage $V_{RMS}$ and the slow response of the voltage-loop error signal $V_{EA}$. A small current-command signal $I_{CMD}$ decreases an input current $I_{DC}$. This causes insufficient energy transmission to maintain the bulk voltage $V_{BULK}$ at the second level $V_{BULK2}$. The first voltage undershooting therefore occurs as shown in the dotted circle W.

In addition to the first voltage undershooting, a faulty operation of the bulk voltage $V_{BULK}$ is discussed as follows. Normally, the voltage-loop error signal $V_{EA}$ is charged up and stops at the lower threshold $V_{TH(L)}$. Unfortunately, further referring to equation (1), in order to keep the current-command signal $I_{CMD}$ constant, the current loop of the conventional switching controller 100a continues increasing the voltage-loop error signal $V_{EA}$ until it arrives at the upper threshold $V_{TH(H)}$, as period $T_3$ illustrates.

When the voltage-loop error signal $V_{EA}$ exceeds the upper threshold $V_{TH(H)}$, the power-saving signal $S_E$ is disabled to terminate the programming current $I_Q$. This dramatically pulls down the feedback voltage $V_{FB}$ and therefore linearly pulls up the bulk voltage $V_{BULK}$ in error, as the bold dotted waveform shows.

The second voltage undershooting (in dotted circle X) is also explained as follows. As the load of the PFC converter increases, the voltage-loop error signal $V_{EA}$ will gradually increase in response to the load increment, as period $T_4$ illustrates. When the voltage-loop error signal $V_{EA}$ exceeds the upper threshold $V_{TH(H)}$, the power-saving signal $S_E$ is disabled to turn off the switch 261. The programming current $I_Q$ is then terminated and the feedback voltage $V_{FB}$ therefore drops to a voltage level $V_{R0}$. The feedback threshold $V_R$ and the voltage level $V_{R0}$ are respectively expressed by following equations (3) and (4):

$$V_R = I_Q \times \left(\frac{R_{51} \times R_{52}}{R_{51} + R_{52}}\right) + V_{BULK} \times \left(\frac{R_{52}}{R_{51} + R_{52}}\right) \qquad (3)$$

$$V_{R0} = V_R - \Delta V = V_R - \left[I_Q \times \left(\frac{R_{51} \times R_{52}}{R_{51} + R_{52}}\right)\right], \qquad (4)$$

where $I_Q$ is the programming current, $R_{51}$ and $R_{52}$ are respectively the resistance of the resistors 51 and 52, and $\Delta V$ is the difference between the feedback threshold $V_R$ and the voltage level $V_{R0}$.

As period $T_5$ illustrates, the voltage-loop error signal $V_{EA}$ continues to be charged up to its maximum magnitude $V_{EA(MAX)}$ which is capable of maximizing the current-command signal $I_{CMD}$ to pull up the bulk voltage $V_{BULK}$ without voltage undershooting. Limited to the slow response of the voltage-loop error signal $V_{EA}$, as the load of the PFC converter draws power from the PFC converter, the second voltage undershooting occurs as shown in the dotted circle X.

Voltage undershooting at the bulk voltage of the PFC converter incurs insufficient power supply required by the load, such as the PWM circuit 60. This might cause a brownout condition for the PWM circuit 60. Even though the related art as mentioned above solves the problem of redundant power consumption under light-load condition for the PFC converter, it still fails to overcome the voltage undershooting problem.

As a result, there is a need to provide a PFC converter not only capable of regulating the bulk voltage in response to different load conditions but also smoothly regulating the bulk voltage without voltage undershooting.

SUMMARY OF THE INVENTION

A switching controller for a PFC converter is provided. The switching controller comprises a switching-control circuit, a current-command circuit, a programmable feedback circuit, a modulator, an over-voltage detection circuit, and a light-load detection circuit. The switching-control circuit generates a switching signal. The current-command circuit receives a line-effective voltage, a line-reference current, and a voltage-loop error signal to provide a current-loop error signal to the switching-control circuit. The light-load detection circuit is coupled to the switching-control circuit and the modulator for generating a power-saving signal by detecting the voltage-loop error signal. The programmable feedback circuit is coupled to the light-load detection circuit for generating a programming current in response to load conditions of the PFC converter. The modulator is coupled to the light-load detection circuit for generating the voltage-loop error signal. The over-voltage detection circuit is coupled to the programmable feedback circuit and the modulator for modulating the voltage-loop error signal.

According to an aspect of the present invention, the bulk voltage of the PFC converter at different levels is regulated in response to load conditions.

According to another aspect of the present invention, a turbo current is used to eliminate a first voltage undershooting of the bulk voltage of the PFC converter at the transient that the bulk voltage decreases to arrive at a second level from a first level.

According to another aspect of the present invention, the line-effective voltage and the voltage-loop error signal are utilized to avoid a faulty operation of the bulk voltage of the PFC converter.

According to another aspect of the present invention, the voltage-loop error signal is maximized to eliminate a second voltage undershooting of the bulk voltage of the PFC converter at the transient that the bulk voltage starts to increase toward the first level from the second level.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are comprised to provide further understanding of the invention, and are incorporated into and constitute a part of this specification. The drawings illustrate embodiments of the invention and, together with the description, serve to explain the principles of the invention.

DESCRIPTION OF THE EMBODIMENTS

Referring now to the drawings wherein the contents are for purposes of illustrating the embodiment of the invention only and not for purposes of limiting the same. Components having similar or identical functions as aforementioned to the related art will be assigned the same numbers for following descriptions.

Figure 4:
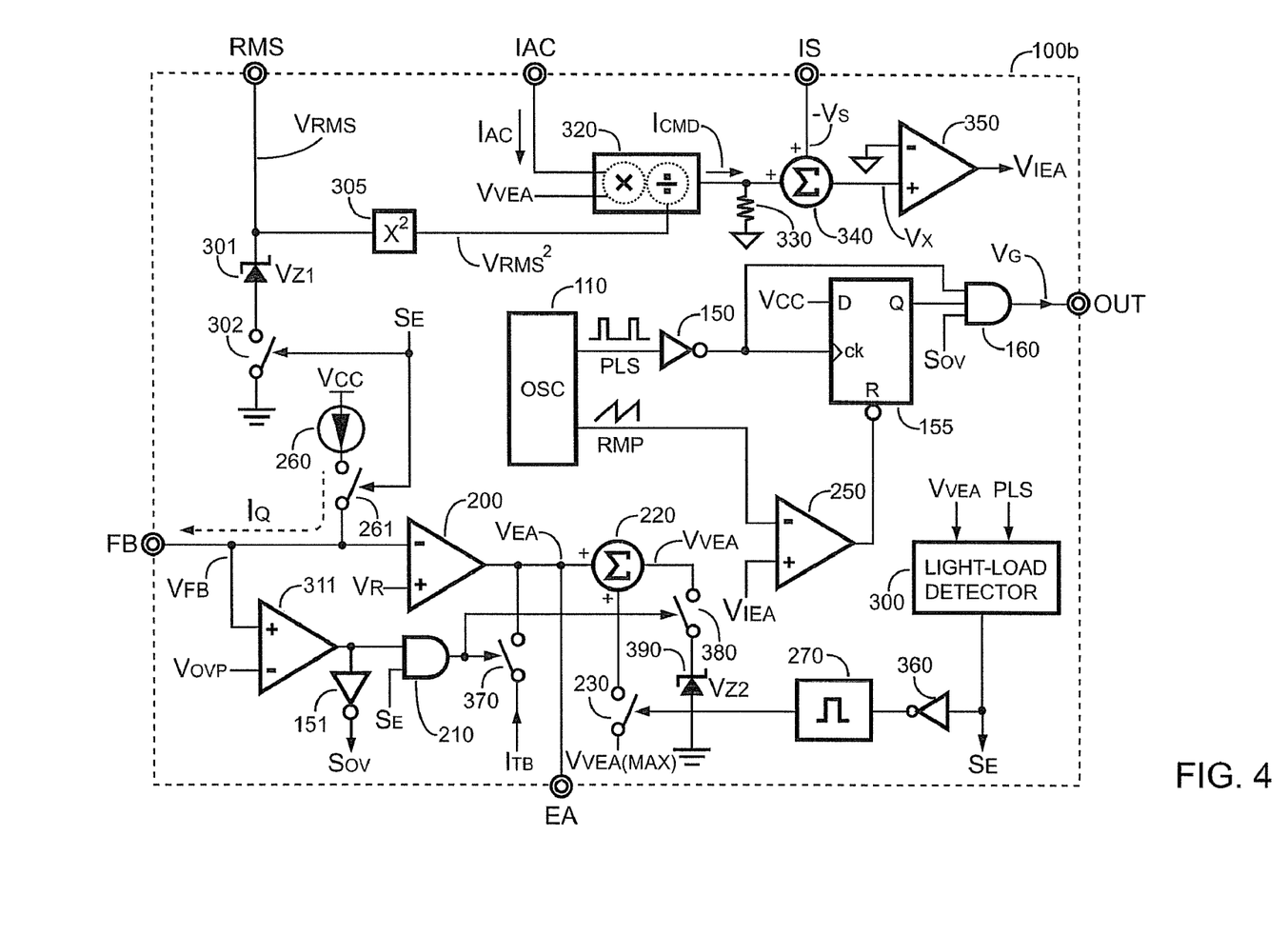
FIG. 4 shows a switching controller of the PFC converter according to an embodiment of the present invention.

FIG. 4 shows a switching controller 100b of a PFC converter in FIG. 1 according to an embodiment of the present invention. The switching controller 100b comprises a switching-control circuit, a current-command circuit, a programmable feedback circuit, a modulator, an over-voltage detection circuit, a light-load detection circuit, a line-voltage terminal RMS, a line-current terminal IAC, a current-sense terminal IS, a compensation terminal EA, a feedback terminal FB, and an output terminal OUT.

As shown in FIG. 4, the current-command circuit comprises a square circuit 305, a multiplier-divider 320, a resistor 330, an adder 340, a current-loop error amplifier 350, and a first clamping circuit. An input terminal of the square circuit 305 is connected to the line-voltage terminal RMS for receiving a line-effective voltage $V_{RMS}$. The first clamping circuit comprises a switch 302 and a clamping device, such as a zener diode 301 with its reverse breakdown voltage $V_{Z1}$, which are connected in series between the line-voltage terminal RMS and a ground reference. The multiplier-divider 320 comprises a first multiplier input terminal connected to the line-current terminal IAC for receiving a line-reference current $I_{AC}$, a second multiplier input terminal for receiving a voltage-loop error signal $V_{VEA}$, and a divider input terminal connected to an output terminal of the square circuit 305 for receiving a squared line-effective voltage $V_{RMS}^2$. The multiplier-divider 320 generates a current-command signal $I_{CMD}$. A first input terminal of the adder 340 receives a voltage converted by the resistor 330 from the current-command signal $I_{CMD}$. A second input terminal of the adder 340 receives a sense voltage $-V_S$ at the current-sense terminal IS. A command signal $V_X$ generated at an output terminal of the adder 340 is supplied to a positive input terminal of the current-loop error amplifier 350. A negative input terminal of the current-loop error amplifier 350 is connected to the ground reference. The current-loop error amplifier 350 amplifies the command signal $V_X$ to generate a current-loop error signal $V_{IEA}$ at its output terminal.

The switching-control circuit comprises an oscillator 110, an inverter 150, a flip-flop 155, an AND gate 160, and a comparator 250. The oscillator 110 generates a pulse signal PLS and a ramp signal RMP. The pulse signal PLS clocks the flip-flop 155 via the inverter 150 to enable the switching signal $V_G$. The comparator 250 compares the current-loop error signal $V_{IEA}$ and the ramp signal RMP. Once the ramp signal RMP is higher than the current-loop error signal $V_{IEA}$, the switching signal $V_G$ is disabled via the flip-flop 155 and the AND gate 160.

The programmable feedback circuit comprises a current source 260, a switch 261, and a voltage-loop error amplifier 200. The current source 260 is supplied with a supply voltage $V_{CC}$. The switch 261 is connected between the current source 260 and a negative input terminal of the voltage-loop error amplifier 200. The negative input terminal of the voltage-loop error amplifier 200 is connected to the feedback terminal FB of the switching controller 100a and a voltage divider 50 in FIG. 1. A positive input terminal of the voltage-loop error amplifier 200 is supplied with a feedback threshold $V_R$. An output terminal of the voltage-loop error amplifier 200 is connected to the compensation terminal EA to generate an error signal $V_{EA}$.

The modulator comprises switches 230 and 370, an adder 220, and a second clamping circuit. The second clamping circuit comprises a switch 380 and another clamping device, such as zener diode 390 with its reverse breakdown voltage $V_{Z2}$. A first terminal of the switch 370 is supplied with a turbo current $I_{TB}$. A second terminal of the switch 370 is connected to the output terminal of the voltage-loop error amplifier 200, the compensation terminal EA, and a first input terminal of the adder 220. An output terminal of the adder 220 generates a voltage-loop error signal $V_{VEA}$. A first terminal of the switch 230 is supplied with a maximum voltage-loop error signal $V_{VEA(MAX)}$. The maximum voltage-loop error signal $VV_{EA(MAX)}$ is capable of maximizing the current-command signal $I_{CMD}$ to pull up the bulk voltage $V_{BULK}$ without voltage undershooting. A second terminal of the switch 230 is connected to a second input terminal of the adder 220. The switch 380 and the zener diode 390 are connected in series between the output terminal of the adder 220 and the ground reference.

The light-load detection circuit comprises a light-load detector 300, an inverter 360, and a one-shot circuit 270. The light-load detector 300 receives the voltage-loop error signal $V_{VEA}$ and the pulse signal PLS to generate a power-saving signal $S_E$. The power-saving signal $S_E$ controls the switch 261 of the programmable feedback circuit and the switch 302 of the first clamping circuit. The light-load detector 300 has a hysteresis characteristic with an upper threshold $V_{TH(H)}$ and a lower threshold $V_{TH(L)}$. A light-load condition is detected once the voltage-loop error signal $V_{VEA}$ is lower than the lower threshold $V_{TH(L)}$. The power-saving signal $S_E$ is enabled when the light-load detector 300 detects the light-load condition. The one-shot circuit 270 receives the power-saving signal $S_E$ via the inverter 360 and controls the switch 230 of the modulator.

The over-voltage detection circuit comprises a comparator 311, an inverter 151, and an AND gate 210. A positive input terminal of the comparator 311 is connected to the feedback terminal FB for receiving a feedback signal $V_{FB}$ from the voltage divider 50. A negative input terminal of the comparator 311 is supplied with an over-voltage threshold $V_{PVP}$. An output terminal of the comparator 311 is connected to an input terminal of the AND gate 210. When the feedback voltage $V_{FB}$ exceeds the over-voltage threshold $V_{OVP}$, the comparator 311 generates an over-voltage signal $S_{OV}$ via the inverter 151 to disable the switching signal $V_G$ via the AND gate 160. Another input terminal of the AND gate 210 is supplied with the power-saving signal $S_E$. An output terminal of the AND gate 210 is coupled to control the switches 370 and 380 of the modulator.

Following will introduce how the present invention overcomes the first voltage undershooting (as shown in the dotted circle W in FIG. 3) at the transient that the bulk voltage $V_{BULK}$ decreases to arrive at the second level $V_{BULK2}$ from a first level $V_{BULK1}$ in the related art. The bulk voltage $V_{BULK}$ is regulated at the first level $V_{BULK1}$ when the PFC converter is under normal/heavy load condition. As the load at the output of the PFC converter decreases, since the feedback voltage $V_{FB}$ is supplied to the negative input terminal of the voltage-loop error amplifier 200, the error signal $V_{EA}$ generated at the output terminal of the voltage-loop error amplifier 200 will be decreased. The voltage-loop error signal $V_{VEA}$ is equal to the error signal $V_{EA}$ as the switch 230 is turned off.

Figure 5:
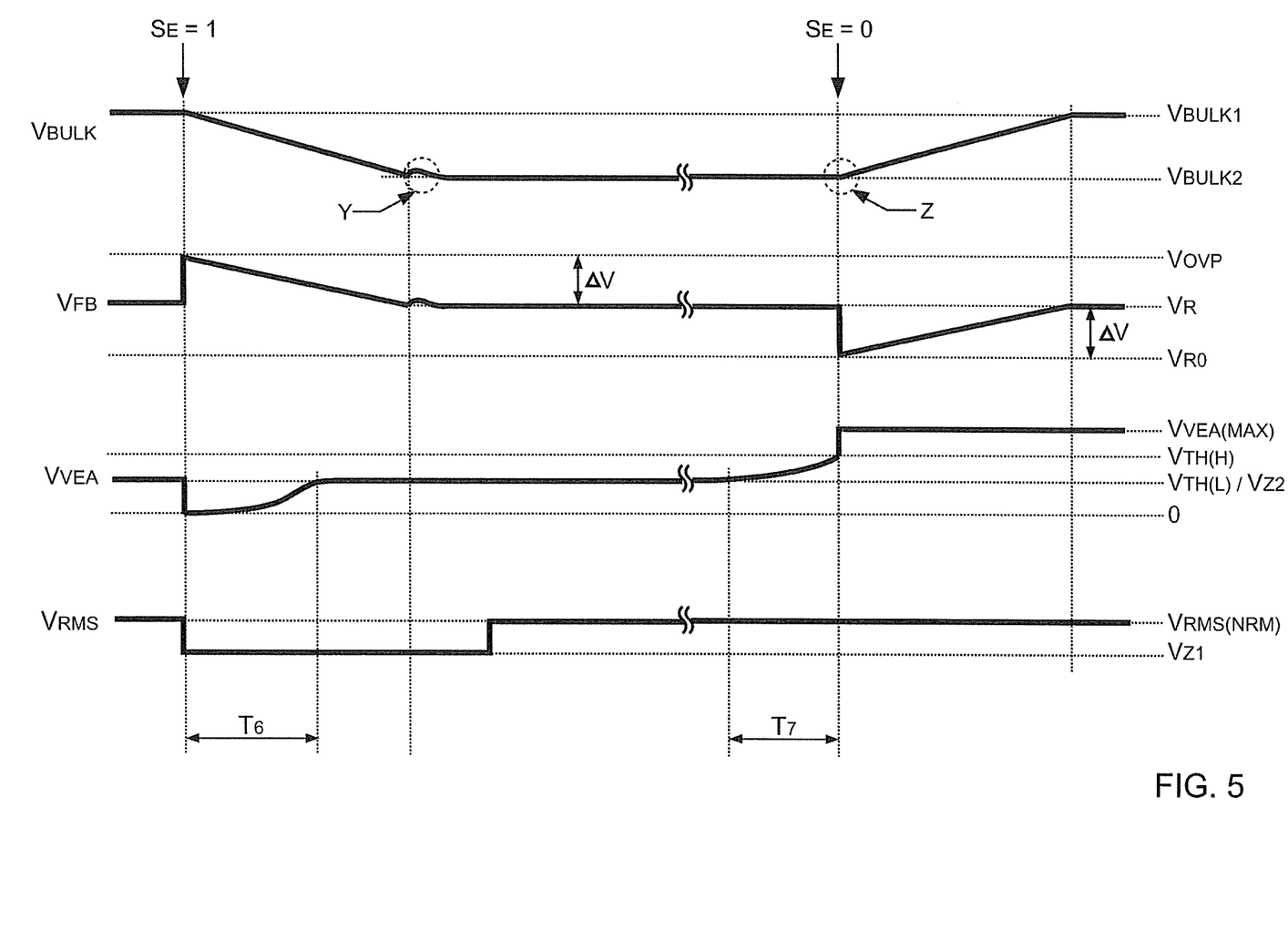
FIG. 5 shows key waveforms of the switching controller of the PFC converter according to the present invention.

As the voltage-loop error signal $V_{VEA}$ is lower than the lower threshold $V_{TH(L)}$, the power-saving signal $S_E$ is enabled to turn on the switch 261. The switch 302 is turned on and therefore the line-effective voltage $V_{RMS}$ is clamped at the reverse breakdown voltage $V_{Z1}$ of the zener diode 301. The programming current $I_Q$ flows toward the voltage divider 50 in FIG. 1, which dramatically increases the feedback voltage $V_{FB}$. When the feedback voltage $V_{FB}$ exceeds the over-voltage threshold $V_{OVP}$, the comparator 311 is associated with the power-saving signal $S_E$ to generate a logic-high level at the output terminal of the AND gate 210. This turns on the switches 370 and 380 simultaneously. As the switch 370 is turned on, the turbo current $I_{TB}$ is associated with an output current of the voltage-loop error amplifier 200 to charge up the compensation capacitor 45 via the compensation terminal EA. As period $T_6$ illustrates, the voltage-loop error signal $V_{VEA}$ continues to ramp up until it is clamped by the zener diode 390 at its reverse breakdown voltage $V_{Z2}$. The magnitude of the lower threshold $V_{TH(L)}$ is predetermined the same as that of the reverse breakdown voltage $V_{Z2}$ of the zener diode 390. Compared to the related art, the present invention in advance charges up the voltage-loop error signal $V_{VEA}$ to the magnitude of the lower threshold $V_{TH(L)}$. In the meanwhile, the line-effective voltage $V_{RMS}$ is currently clamped at the reverse breakdown voltage $V_{Z1}$ of the zener diode 301, which increases the current-command signal $I_{CMD}$. This instantly pulls up the bulk voltage $V_{BULK}$ (as shown in a dotted circle Y in FIG. 5) to successfully avoid the first voltage undershooting of the bulk voltage $V_{BULK}$.

Following will also introduce how the present invention overcomes the second voltage undershooting (as shown in the dotted circle X in FIG. 3) at the transient that the bulk voltage $V_{BULK}$ starts to increase toward the first level $V_{BULK1}$ from the second level $V_{BULK2}$ in the related art. As the load of the PFC converter increases, the voltage-loop error signal $V_{VEA}$ will gradually increase in response to the increment of the load, as period $T_7$ illustrates. When the voltage-loop error signal $V_{EA}$ exceeds the upper threshold $V_{TH(H)}$, the power-saving signal $S_E$ is disabled to turn off the switch 261. The programming current $I_Q$ is then terminated and the feedback voltage $V_{FB}$ therefore drops to a voltage level $V_{R0}$. Once the power-saving signal $S_E$ is disabled, the one-shot circuit 270 generates a short logic-high pulse to turn on the switch 230. The switch 230 conducts the maximum voltage-loop error signal $V_{VEA(MAX)}$ to the second input terminal of the adder 220. This instantly pulls up the voltage-loop error signal $V_{VEA}$ to the magnitude of the maximum voltage-loop error signal $V_{VEA(MAX)}$ from the level of the upper threshold $V_{TH(H)}$. The current-command signal $I_{CMD}$ is then instantly maximized and the input current $I_{DC}$ is therefore increased in response thereto. The bulk voltage $V_{BULK}$ is pulled up (as shown in a dotted circle Z in FIG. 5) to successfully avoid the second voltage undershooting in the related art.

Figure 6:
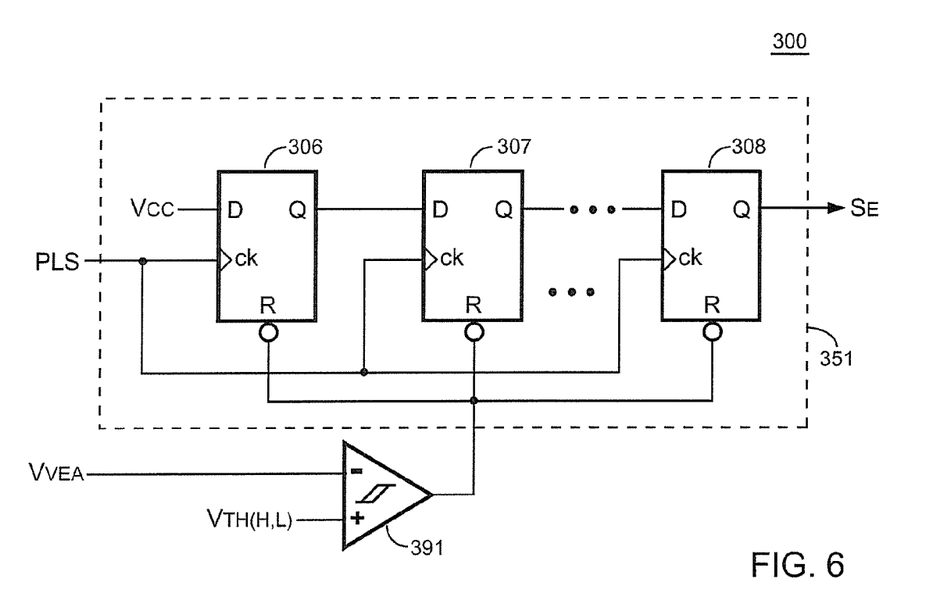
FIG. 6 shows a light-load detector of the switching controller according to an embodiment of the present invention.

FIG. 6 shows the light-load detector 300 of the switching controller 100b according to an embodiment of the present invention. The light-load detector 300 comprises a hysteresis comparator 391 and a delay circuit 351. The delay circuit 351 is formed by a plurality of cascaded flip-flops 306~308, in one embodiment, to provide a delay period. The hysteresis comparator 391 compares the voltage-loop error signal $V_{VEA}$ with its hysteresis references which are the upper threshold $V_{TH(H)}$ and the lower threshold $V_{TH(L)}$ of the light-load detection circuit. When the voltage-loop error signal $V_{VEA}$ is lower than the lower threshold $V_{TH(L)}$, which indicates a light-load condition, the hysteresis comparator 391 enables the delay circuit 351. The flip-flop 308 generates the power-saving signal $S_E$ after the delay period of the delay circuit 351. The power-saving signal $S_E$ is only enabled as the light-load condition of the PFC converter sustains for a longer time period than the delay period of the delay circuit 351. The power-saving signal $S_E$ is disabled once the voltage-loop error signal $V_{VEA}$ is higher than the upper threshold $V_{TH(H)}$ for a longer time period than the delay period of the delay circuit 351.

Figure 7:
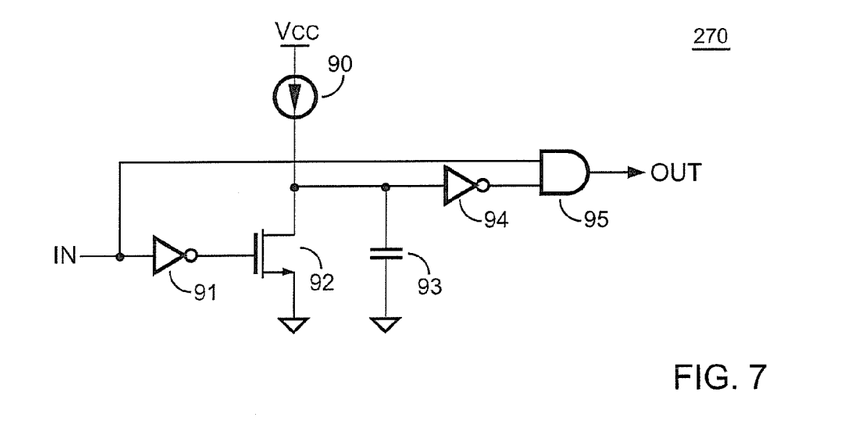
FIG. 7 shows a one-shot circuit of the switching controller according to an embodiment of the present invention.

FIG. 7 shows a one-shot circuit 270 of the switching controller according to an embodiment of the present invention. The one-shot circuit 270 comprises inverters 91 and 94, a current source 90, a transistor 92, a capacitor 93, and an AND gate 95. An input terminal IN of the one-shot circuit 270 is coupled to a gate of the transistor 92 via the inverter 91. The input terminal IN of the one-shot circuit 270 is also coupled to an input terminal of the AND gate 95. The current source 90 is coupled between the supply voltage $V_{CC}$ and a drain of the transistor 92. A source of the transistor 92 is connected to the ground reference. The capacitor 93 is connected between the drain of the transistor 92 and the ground reference. The inverter 94 is coupled between the drain of the transistor 92 and another input terminal of the AND gate 95. An output terminal of the AND gate 95 is coupled to an output terminal OUT of the one-shot circuit 270. As the input terminal IN of the one-shot circuit 270 becomes logic-high, the output terminal OUT of the one-shot circuit 270 will generate a short logic-high pulse whose width is determined by the current amplitude of the current source 90 and the capacitance of the capacitor 93.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A switching controller for a power factor correction converter, the switching controller comprising:
    a switching-control circuit for generating a switching signal;
    a current-command circuit for receiving a line-effective voltage, a line-reference current, a first error signal, and a sense voltage to provide a second error signal to said switching-control circuit;
    a light-load detection circuit coupled to said switching-control circuit for generating a power-saving signal by detecting said first error signal;
    a programmable feedback circuit coupled to said light-load detection circuit for generating a programming current in response to load conditions of said power factor correction converter;
    a modulator coupled to said light-load detection circuit for generating said first error signal; and
    an over-voltage detection circuit coupled to said programmable feedback circuit and said modulator for modulating said first error signal and coupled to said switching-control circuit for disabling said switching signal.

2. The switching controller as claimed in claim 1, said current-command circuit comprising:
    a multiplier-divider for generating a current-command signal, wherein said current-command signal is in proportion to said line-reference current and said first error signal and in inverse proportion to said line-effective voltage;
    a first clamping circuit coupled to said multiplier-divider, wherein said first clamping circuit comprises a first switch and a first clamping device connected in series, and said line-effective voltage is clamped by said first clamping device at a first clamping voltage when said power-saving signal is enabled;
    a first adder coupled to said multiplier-divider for generating a command signal by adding said current-command signal and said sense voltage; and
    a second error amplifier coupled to said first adder for amplifying said command signal to generate said second error signal.

3. The switching controller as claimed in claim 2, said programmable feedback circuit comprising:
    a second switch controlled by said power-saving signal, wherein said second switch conducts a programming current to modulate a feedback voltage, and said feedback voltage is correlated to said load conditions of said power factor correction converter; and
    a first error amplifier having a first input terminal for receiving said feedback voltage and a second input terminal for receiving a feedback threshold, wherein said first error amplifier amplifies a difference of said feedback threshold and said feedback voltage to generate an error signal at an output terminal of said first error amplifier.

4. The switching controller as claimed in claim 3, said modulator comprising:
    a second adder having a first input terminal supplied with said error signal, a second input terminal, and an output terminal generating said first error signal;
    a third switch having a first terminal supplied with a maximum error signal and a second terminal connected to said second input terminal of said second adder;
    a fourth switch having a first terminal supplied with a turbo current and a second terminal connected to said output terminal of said first error amplifier; and
    a second clamping circuit comprising a fifth switch and a second clamping device connected in series, wherein said second clamping circuit is connected between said output terminal of said second adder and a ground reference.

5. The switching controller as claimed in claim 4, said over-voltage detection circuit comprising:
    a comparator having a first input terminal supplied with said feedback voltage, a second input terminal supplied with an over-voltage threshold, and an output terminal to generate an over-voltage signal via a first inverter to disable said switching signal; and
    an AND gate having a first input terminal connected to said output terminal of said comparator and a second input terminal supplied with said power-saving signal, and an output terminal to control said fourth switch and said fifth switch.

6. The switching controller as claimed in claim 4, said light-load detection circuit comprising:
    a light-load detector enabling said power-saving signal when said first error signal is lower than a lower threshold of said light-load detector and disabling said power-saving signal when said first error signal is higher than an upper threshold of said light-load detector; and
    a one-shot circuit having an input terminal supplied with said power-saving signal via a second inverter, wherein an output terminal of said one-shot circuit controls said third switch.

7. The switching controller as claimed in claim 1, said second error signal being used to disable said switching signal.

8. The switching controller as claimed in claim 1, said sense voltage representing an overall system current of said power factor correction converter.

9. The switching controller as claimed in claim 3, said output terminal of said first error amplifier being further connected to a compensation capacitor for generating said error signal.

10. The switching controller as claimed in claim 4, a magnitude of said maximum error signal being equal to a maximum magnitude of said first error signal.

11. The switching controller as claimed in claim 4, said third switch is turned on to increase said first error signal to a magnitude of said maximum error signal for maximizing said current-command signal.

12. The switching controller as claimed in claim 6, said first error signal being clamped by said second clamping device when said first error signal exceeds a second clamping voltage of said second clamping device.

13. The switching controller as claimed in claim 6, a magnitude of said upper threshold being higher than that of said lower threshold.

14. The switching controller as claimed in claim 12, said second clamping voltage being equal to said lower threshold of said light-load detector.

* * * * *